United States Patent
Tanaka (10) Patent No.: US 10,605,923 B2
(45) Date of Patent: Mar. 31, 2020

(54) DOWNSIZED REFLECTING DEVICE HAVING OSCILLATION PART CONSTITUTED BY MIRROR PARE AND HINGE PART FOR MAKING MIRROR PART OSCILLATE WITH RESPECT TO SUPPORT FRAME FOR PERFORMING WIDE ANGLE SCANNING

(71) Applicant: FUNAI ELECTRIC CO., LTD., Osaka (JP)

(72) Inventor: Fuminori Tanaka, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 137 days.

(21) Appl. No.: 15/911,179

(22) Filed: Mar. 5, 2018

(65) Prior Publication Data
US 2018/0252816 A1    Sep. 6, 2018

(30) Foreign Application Priority Data

Mar. 6, 2017  (JP) ................................ 2017-041702

(51) Int. Cl.
  *G02B 26/08*   (2006.01)
  *G01S 17/90*   (2020.01)
  (Continued)

(52) U.S. Cl.
  CPC ............ *G01S 17/90* (2020.01); *G01S 7/4808* (2013.01); *G01S 7/4813* (2013.01);
  (Continued)

(58) Field of Classification Search
  None
  See application file for complete search history.

(56) References Cited

U.S. PATENT DOCUMENTS

| 5,834,864 A * | 11/1998 | Hesterman | ............. B82Y 35/00 310/40 MM |
| 6,390,370 B1 * | 5/2002 | Plesko | ................. G02B 13/001 235/454 |

(Continued)

FOREIGN PATENT DOCUMENTS

JP    2014142517    8/2014

OTHER PUBLICATIONS

Chengliang Pan et al.,"A New Two-Axis Optical Scanner Actuated by Piezoelectric Bimorphs", International Journal of Optomechatronics, vol. 6, Issue 4, Nov. 1, 2012, pp. 336-349.

(Continued)

*Primary Examiner* — Jennifer D. Carruth
(74) *Attorney, Agent, or Firm* — JCIPRNET (57) ABSTRACT

Provided a reflecting device in which a mirror area is large, wide angle scanning is possible, and a size thereof is reduced, and particularly a downsized reflecting device that has a suitable specification as vehicle-mounted LiDAR. The reflecting device includes an oscillation part, and the oscillation part includes a mirror part supported on a support frame, and a hinge part engaging the mirror part and the support frame. The mirror part oscillates with respect to the support frame, and the hinge part has a tensile strength of 1500 MPa or higher. A mass M of the mirror part and a resonance frequency $f_0$ of the oscillation part satisfy a relational expression (1) below, $$0.49*f_0+6.23 \leq M \leq 68.6*f_0+46.8 \qquad (1)$$

19 Claims, 10 Drawing Sheets

(51) Int. Cl.
| | |
|---|---|
| G01S 7/481 | (2006.01) |
| G02B 26/10 | (2006.01) |
| G01S 7/486 | (2020.01) |
| G05D 1/02 | (2020.01) |
| G01S 17/42 | (2006.01) |
| G01S 7/48 | (2006.01) |
| G01S 17/26 | (2020.01) |
| G01S 17/86 | (2020.01) |

(52) U.S. Cl.
CPC .......... *G01S 7/4817* (2013.01); *G01S 7/4868* (2013.01); *G01S 17/26* (2020.01); *G01S 17/42* (2013.01); *G01S 17/86* (2020.01); *G02B 26/085* (2013.01); *G02B 26/10* (2013.01); *G02B 26/105* (2013.01); *G05D 1/0236* (2013.01)

(56) References Cited

U.S. PATENT DOCUMENTS

| | | | | |
|---|---|---|---|---|
| 9,052,511 | B1* | 6/2015 | Knirck | G02B 26/0841 |
| 2008/0024590 | A1* | 1/2008 | Nakajima | G02B 26/085 |
| | | | | 347/260 |
| 2009/0021884 | A1* | 1/2009 | Nakamura | B81B 3/0059 |
| | | | | 361/233 |
| 2010/0014142 | A1* | 1/2010 | Akedo | B81B 3/0072 |
| | | | | 359/224.1 |
| 2013/0229698 | A1 | 9/2013 | Honda et al. | |
| 2013/0286151 | A1 | 10/2013 | Wakabayashi et al. | |
| 2014/0327946 | A1* | 11/2014 | van Lierop | B81B 3/007 |
| | | | | 359/198.1 |

OTHER PUBLICATIONS

Y D Gokdel et al.,"Design and fabrication of two-axis micromachined steel scanners", Journal of Micromechanics and Microengineering, vol. 19, No. 7,Jul. 1, 2009, pp. 1-8.

* cited by examiner

DOWNSIZED REFLECTING DEVICE HAVING OSCILLATION PART CONSTITUTED BY MIRROR PARE AND HINGE PART FOR MAKING MIRROR PART OSCILLATE WITH RESPECT TO SUPPORT FRAME FOR PERFORMING WIDE ANGLE SCANNING

CROSS REFERENCE TO RELATED APPLICATIONS

This application claims the priority benefit of Japanese Patent Application No. 2017-041702, filed on Mar. 6, 2017. The entirety of the above-mentioned patent application is hereby incorporated by reference herein and made a part of this specification.

BACKGROUND

Technical Field

The disclosure relates to a reflecting device. More particularly, the disclosure relates to a reflecting device in which a mirror area is large, wide angle scanning is possible, and a size thereof is reduced.

Description of Related Art

Among reflecting devices, a so-called ranging sensor is proposed as an optical scanning device that measures a distance from a measurement position to a target. The ranging sensor acquires distance data by adopting a so-called time-of-fight (TOF) mode, outputting phase difference information between a light emitting timing and a light receiving timing using a pulse-modulated light source, and calculating the output phase difference information signal.

As the optical scanning device that is the reflecting device in which a measurement range is made a wide angle, there is a ranging sensor that adopts a motor and drives the motor to perform optical scanning. For example, a ranging sensor that adopts a polygon mirror as a laser light reflecting member and combines the polygon mirror with a motor is proposed. In addition, a ranging sensor that adopts a driving motor and rotates an overall configuration of an optical system provided for the ranging sensor using the driving motor is known.

Meanwhile, so-called light detection and ranging (LiDAR) is proposed as a remote sensing technique using light. LiDAR measures scattered light for laser irradiation in which light is emitted in a pulse shape, and thereby can analyze a distance to a target located at a long distance and a quality of the target. Application of LiDAR to an advanced driver assistance system (ADAS), automated driving, etc. as the optical scanning device is being investigated.

At least a camera, a laser, and LiDAR are required in an ADAS, automated driving, or the like. The camera and the laser are mainly used to find information about surroundings of a vehicle, and the LiDAR is used as backup to radar. If a vehicle itself performs safe and correct determination, the capacity to perform accurate detection of the target and classification of the target is important in the ADAS, the automated driving, or the like. For this reason, an optical scanning device acting as a reflecting device in which an area of a mirror part is large and a measurement range is made a wide angle is required.

Meanwhile, an oscillation mirror element in which a size of the mirror part is not reduced and which can cope with a high resonance frequency is proposed (e.g., Patent Literature 1). This oscillation mirror element mutually couples a pair of first drive parts, and provides a coupling part in which the mirror part is coupled to a portion between the pair of first drive parts, so that the mirror part is directly coupled to the coupling part. For this reason, in comparison with a case in which the coupling part and the mirror part are indirectly coupled via a twisting bridge part having an elongated shape, rigidity of a connection portion between the mirror part and the coupling part can be increased.

[Patent Literature 1] Japanese Laid-open No. 2014-142517

However, the reflecting device in which the measurement range can be made the wide angle by adopting the motor has a problem that a geometry of the entire reflecting device is enlarged because the motor is adopted. Even when the mirror area of the reflecting device is configured to be increased, the entire reflecting device is enlarged. Especially, to adopt the optical scanning device as vehicle-mounted LiDAR, the optical scanning device needs to be made smaller than an optical scanning device that is a conventional reflecting device, and the wide angle scanning may be possible. Further, even when the optical scanning device is an optical scanning device that is a downsized reflecting device, a mirror area occupied in the entire device may be large.

The oscillation mirror element set forth in Patent Literature 1 has a following issue that, since the configuration in which the mirror part is directly coupled to the coupling part is adopted, and the rigidity of the connection portion between the mirror part and the coupling part is merely increased, it is not easy to realize the high resonance frequency while maintaining a large area of the mirror part.

SUMMARY

An embodiment of the invention includes the following.

A reflecting device includes an oscillation part, and the oscillation part includes a mirror part supported on a support frame, and a hinge part engaging the mirror part and the support frame, wherein the mirror part oscillates with respect to the support frame, the hinge parts have a tensile strength of 1500 MPa or higher, and a mass M of the mirror part and a resonance frequency $f_0$ of the oscillation part satisfy relational expression (1) below, $$0.49 * f_0 + 6.23 \leq M \leq 68.6 * f_0 + 46.8 \tag{1}$$

DESCRIPTION OF THE EMBODIMENTS

One or some exemplary embodiments of the invention is to provide a reflecting device in which a mirror area is large, wide angle scanning is possible, and a size thereof is reduced. In addition, one or some exemplary embodiments of the invention is to provide a downsized reflecting device that is a metal mirror suitable as a ranging sensor, and has a suitable specification, particularly, as vehicle-mounted LiDAR.

The inventors of the invention achieved the invention based on the finding that an oscillation part made up of a mirror part and hinge parts of a reflecting device is formed of a material having a predetermined tensile strength, and the inventors are focused on a relation between a mass (M) of the mirror part and a resonance frequency ($f_0$) of the oscillation part, and thereby a downsized reflecting device in which a mirror area is large and wide angle scanning is possible can be provided.

According to an embodiment of the invention, a reflecting device in which a mirror area is large and wide angle scanning is possible can be provided.

Hereinafter, embodiments of the invention will be described on the basis of the drawings.

First Embodiment

Figure 1A:
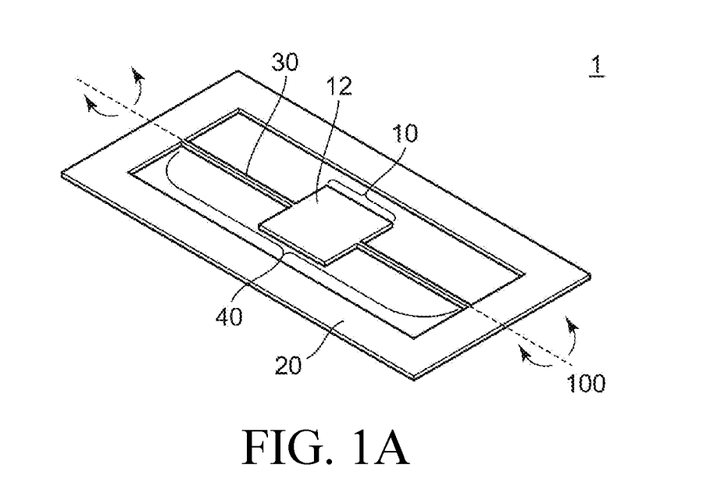
FIG. 1A is a perspective view (a top surface side) illustrating an outline of a reflecting device of a first embodiment.
Figure 1B:
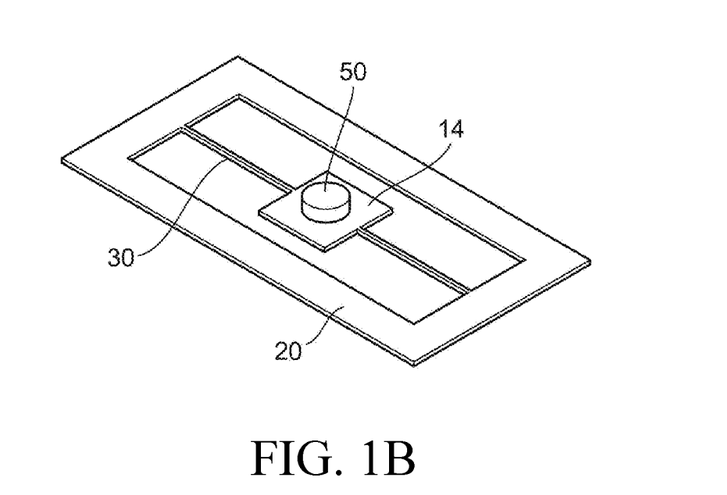
FIG. 1B is a perspective view (a bottom surface side) illustrating the outline of the reflecting device of the first embodiment.

FIGS. 1A and 1B are perspective views illustrating an outline of a reflecting device 1 of a first embodiment. FIG. 1A is a perspective view illustrating a top surface side of the reflecting device 1. As illustrated in FIG. 1A, the reflecting device 1 includes a mirror part 10 that is supported inside a support frame 20 having a plate shape, and hinge parts 30 that engage the mirror part 10 and the support frame 20. The mirror part 10 and the hinge parts 30 constitute an oscillation part 40. The hinge parts 30 extend from the middles of left and right lateral surfaces of the mirror part 10, and are engaged with the inside of the support frame 20. The oscillation part 40 is formed to be symmetrical with respect to the mirror part 10 to enable the mirror part 10 to oscillate in a well-balanced way. That is, the oscillation part 40 is not particularly restricted as long as it is formed such that symmetry is maintained with respect to the center of the mirror part 10, and may be in point symmetry or in line symmetry with respect to the center of the mirror part 10. A shape of each hinge part 30 need only be a shape in which the hinge part engages the mirror part 10 and the support frame 20 and can oscillate the mirror part 10, and may be a rectilinear shape, a meander shape, or the like.

The support frame 20 is formed of a metal. The metal that can be adopted for the support frame 20 may be a metal that is used as a so-called metal frame and has an excellent metal fatigue property. As the metal that can be adopted for the support frame 20, high-strength stainless, a special metal, or the like having a high tensile strength may be adopted. The support frame 20 can be obtained by forming it in a predetermined shape using pressing, etching, etc. like a typical metal frame.

The hinge parts 30 are twisted, and thereby the oscillation part 40 oscillates with respect to the support frame 20. The oscillation part 40 oscillates about an oscillation axis 100 inside the support frame 20 at a predetermined angle. The hinge parts 30 may be formed of a metal having a tensile strength of 1500 MPa or higher. When the tensile strength of the hinge parts 30 is 1500 MPa or higher, an influence of stress resulting from the twisting of the hinge parts 30 can be avoided. When the tensile strength of the hinge parts 30 is 3500 MPa or lower, fatigue resistance to the twisting of the hinge parts 30 is improved. The tensile strength is measured by the method of tensile test for metallic materials prescribed by JIS Z 2241. As a metal of which the oscillation part 40 is formed, SUS 301, SUS 631, and SUS 632 can be given as an example in addition to special metals.

FIG. 1B is a perspective views illustrating a bottom surface side of the reflecting device 1. As illustrated in FIG. 1B, the reflecting device 1 includes an electromagnetically driving magnet 50 on a bottom surface of the mirror part 10. The electromagnetically driving magnet 50 generates a driving force that oscillates the oscillation part 40 using a coil 60 provided to face the electromagnetically driving magnet 50. The bottom surface 14 of the mirror part 10 and the electromagnetically driving magnet 50 are fixed not to be separated even when the oscillation part 40 oscillates. For example, the bottom surface 14 of the mirror part 10 and the electromagnetically driving magnet 50 may be bonded by a curable adhesive such as an epoxy adhesive, a silicone resin, an acrylic resin, a UV curable resin, or the like.

The electromagnetically driving magnet 50 is not particularly restricted as long as it can generate a magnetic field required to greatly twist the hinge parts 30 of the oscillation part 40. For example, as the electromagnetically driving magnet 50, a neodymium magnet, an alnico magnet, or a ferrite magnet, each of which has a high magnetic flux density and a very strong magnetic force, may be used.

Figure 2:
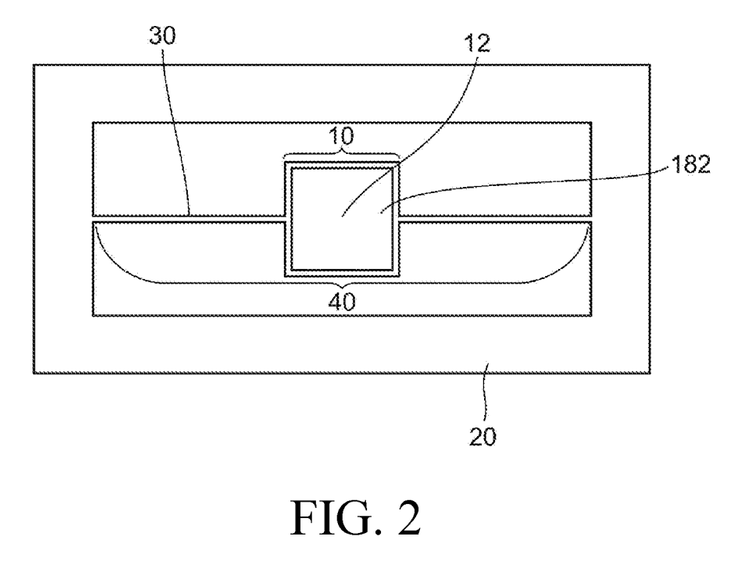
FIG. 2 is a top view illustrating a reflecting surface (a mirror surface) of the reflecting device of the first embodiment.

FIG. 2 is a top view illustrating the mirror part 10 having a reflecting surface (a mirror surface) of the reflecting device 1. As illustrated in FIG. 2, the mirror part 10 functions as a reflecting surface (a mirror surface). The mirror part 10 reflects laser light generated by a laser light generation part (not shown). The mirror or part 10 has a surface that is processed in whole or in part by a mirror polishing treatment or the like to function as the reflecting surface (the mirror surface). The mirror part 10 may include a reflecting film formed of an aluminum thin film, a gold thin film, a silver thin film, a dielectric, etc., a reflecting layer in which the reflecting film is laminated, or a reflecting layer formed of aluminum, gold, silver, or a dielectric to function as the reflecting surface (the mirror surface).

Figure 3A:
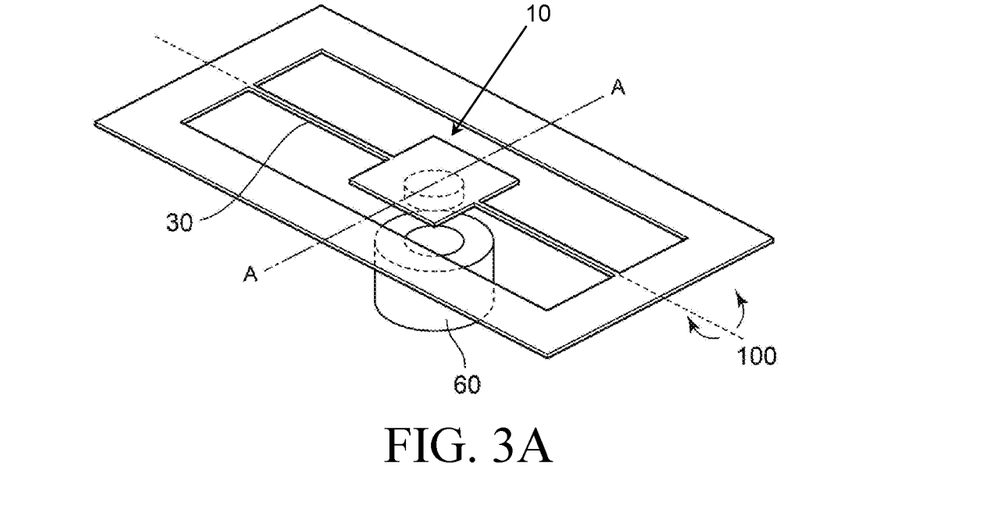
FIG. 3A is a perspective view illustrating the outline of the reflecting device of the first embodiment which has a coil.
Figure 3B:
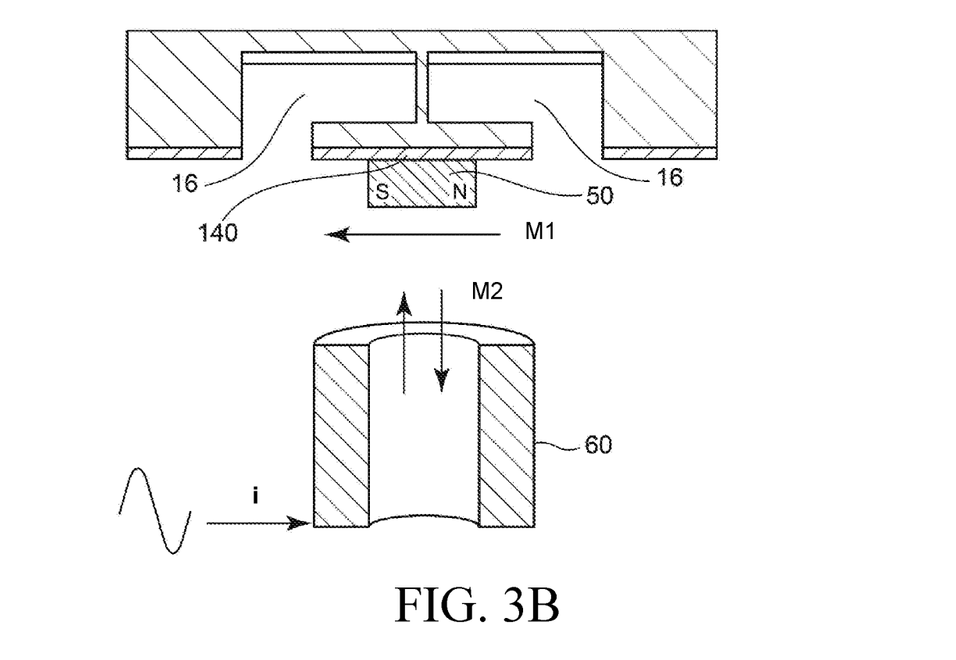
FIG. 3B is a sectional view illustrating an A-A sectional structure of the reflecting device of the first embodiment.

FIGS. 3A and 3B are conceptual views illustrating a driving principle of the reflecting device 1. FIG. 3A is a perspective view illustrating an outline of the reflecting device 1 that includes the mirror part 10 supported inside the support frame 20, the electromagnetically driving magnet 50 on the bottom surface 14 of the mirror part 10, and the coil 60 that faces the electromagnetically driving magnet 50. When the reflecting device 1 illustrated in FIG. 3A is cut along broken line A-A, a sectional structure of the reflecting device 1 is obtained.

FIG. 3B is a sectional view illustrating an A-A sectional structure of the reflecting device 1. As illustrated in FIG. 3B, the reflecting device 1 includes the electromagnetically driving magnet 50 on the bottom surface of the mirror part 10, and the coil 60 at a position opposite to the electromagnetically driving magnet 50. The electromagnetically driving magnet 50 generates a magnetic field M1 in an arrow direction. When an alternating current i flows to the coil 60, a magnetic field M2 is generated at the coil 60 in an arrow direction. An attractive force and a repulsive force are generated between the electromagnetically driving magnet 50 and the coil 60. The mirror part 10 is oscillated by the attractive force and the repulsive force.

Resonance of the oscillation part 40 is generated by applying an AC voltage of the same frequency as a resonance frequency of the oscillation part 40 made up of the mirror part 10 and the hinge parts 30 to the coil 60. In this way, the reflecting device 1 can reflect laser light at a wide angle to perform optical scanning by twisting the hinge parts 30 constituting the oscillation part 40 using the resonance of the oscillation part 40. Since the reflecting device 1 can greatly twist the oscillation part 40 with respect to the support frame 20 using the resonance, the reflecting device 1 has high efficiency and can obtain a great optical scanning angle. A method of generating the resonance of the oscillation part 40 is not particularly restricted, but a piezoelectric driving method or the like in which a piezoelectric element is mounted on the support frame 20, or an electromagnetic driving method or the like may be adopted.

Figure 4:
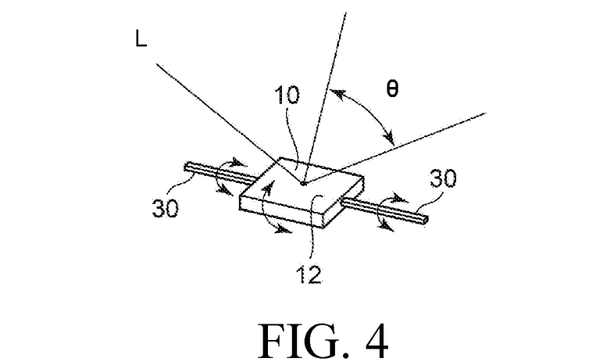
FIG. 4 is a model diagram illustrating a state of reflection (optical scanning) based on the reflecting device of the first embodiment.

FIG. 4 is a model diagram illustrating a state of optical scanning based on the reflecting device 1. The laser light L generated from the laser light generation part (not shown) is reflected by the mirror surface (the reflecting surface) provided on the top surface of the mirror part 10. The hinge parts 30 constituting the oscillation part 40 are twisted, and thereby the mirror part 10 oscillates about the oscillation axis 100. When the mirror part 10 is oscillated, the mirror surface (the reflecting surface) is also oscillated. As the mirror surface (the reflecting surface) of the mirror part 10 oscillates, an angle at which the laser light L is reflected is also changed. As the mirror part 10 oscillates, the optical scanning angle θ is changed.

(Structural Design of the Reflecting Device 1)

A technical feature of the reflecting device 1 of an embodiment of the invention is the oscillation part 40 made up of the mirror part 10 and the hinge parts 30. Hereinafter, the way the mirror part 10 and the hinge parts 30 are designed in order to maximize the mirror area of the mirror part 10 and enable wide angle scanning in the reflecting device 1 will be described.

Figure 5:
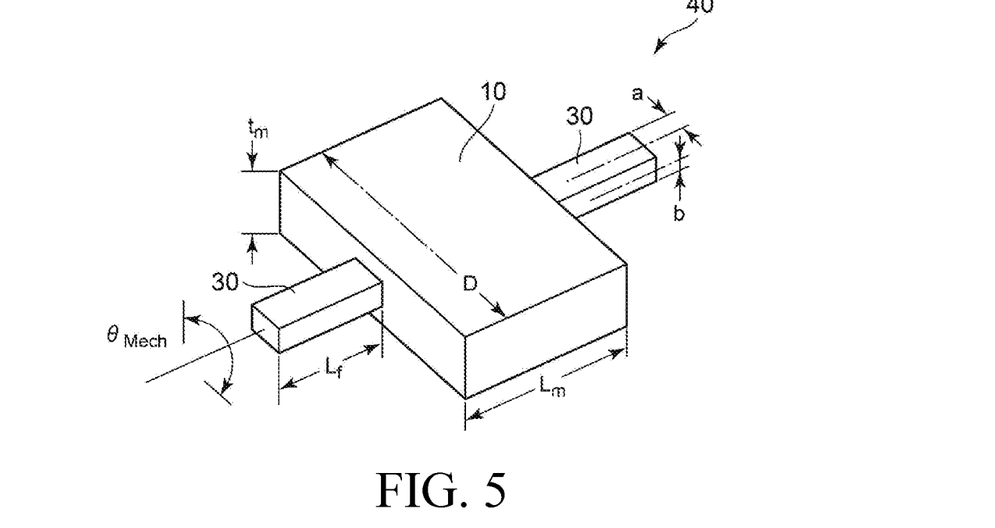
FIG. 5 is a model diagram illustrating parameters required when the reflecting device of the first embodiment is designed.

FIG. 5 is a model diagram illustrating dimensional parameters required when the mirror part 10 and the hinge parts 30 of the reflecting device 1 are designed. As illustrated in FIG. 5, the oscillation part 40 is made up of the mirror part 10 and the hinge parts 30. Parameters determining a shape and size of each hinge part 30 are a length $L_f$ [mm] of each hinge part 30, a width $2a$ [mm] of each hinge part 30, and a thickness $2b$ [mm] of each hinge part 30. The length $L_f$ [min] of each hinge part 30 is a distance from an end of the mirror part 10 to an end of the support frame 20.

The parameters determining a shape and size of each mirror part 10 are divided into those for determining the mirror area of the mirror surface (the reflecting surface) and those required when the mirror part 10 is processed. The parameters for determining the mirror area are a width $L_m$ [mm] of the mirror part 10 and a length D [mm] of the mirror part 10. That is, the product of the width $L_m$ [mm] of the mirror part 10 and the length D [mm] of the mirror part 10 determines the mirror area of the mirror surface (the reflecting surface) of the mirror part 10.

The mirror part 10 illustrated in FIG. 5 is configured such that the length D [mm] of the mirror part 10 is set to be longer than the width $L_m$ [mm] of the mirror part 10, but it is not limited thereto and can be appropriately modified according to the specification of the reflecting device 1. That is, the width $L_m$ [mm] of the mirror part 10 and the length D [mm] of the mirror part 10 may be identical in the mirror part 10. In addition, the width $L_m$ [mm] of the mirror part 10 may be set to be longer than the length D [mm] of the mirror part 10.

The parameters required when the mirror part 10 is processed are a thickness $t_m$ [mm] of the mirror part 10, and a thinning rate OP [%] calculated by forming a recess 16 and an opening 142 that are thinning parts in order to reduce weight of the bottom surface that is the surface different from the reflecting surface of the mirror part 10. When a structure of the mirror part 10 is a structure in which a reflecting member (a glass substrate) is attached to a top surface 12 that is the reflecting surface of the mirror part, a thickness [mm] of the reflecting member (the glass substrate) and a thickness [mm] of an adhesive used when the reflecting member (the glass substrate) is attached to the top surface 12 of the mirror part 10 are also necessary parameters.

The thinning rate OP [%] may range from 20% to 80% in view of a mechanical strength and weight reduction of the mirror part 10. When the thinning rate OP [%] is 20% or more, an effect of the weight reduction of the mirror part 10 can be obtained and the length of each hinge part 30 can be reduced. When the thinning rate OP [%] is 80% or less, the mechanical strength of the mirror part 10 can be maintained.

When the recess 16 and the opening 142 that are the thinning parts are not formed in the bottom surface 14 that is the surface different from the reflecting surface of the mirror part 10 in the structure of the mirror part 10, no thinning parts need to be provided. When the structure of the mirror part 10 is not the structure in which the reflecting member (the glass substrate) 18 is attached to the top surface 12 of the mirror part 10, the thickness [mm] of the reflecting member (the glass substrate) 18 and the thickness [mm] of the adhesive do not need to be provided.

As illustrated in FIG. 5, the resonance frequency $f_0$ [Hz] of the oscillation part 40 made up of the mirror part 10 and the hinge parts 30 is set, and an angle generated when the oscillation part 40 oscillates with respect to the support frame 20 due to the resonance frequency is set to a mechanical swing angle $\theta_{Mech}$ [deg.].

The reflecting device 1 of the first embodiment is a downsized reflecting device 1 in which a mirror area is large and wide angle scanning is possible, and is particularly characterized in that it has a specification suitable for vehicle-mounted LiDAR. From this technical viewpoint, a maximum value MAX and a minimum value MIN of parameters required to determine a structure of the reflecting device that is made much smaller than a conventional reflecting device are set for each of the aforementioned parameters.

Figure 6:
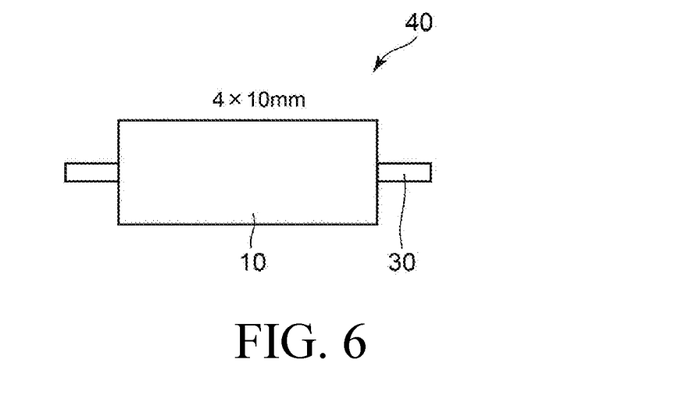
FIG. 6 is a model diagram illustrating a specification of an oscillation part 40 of the reflecting device of the first embodiment.

FIG. 6 is a model diagram illustrating a specification of the oscillation part 40 made up of the mirror part 10 and the hinge parts 30 of the reflecting device 1. As a specification of the mirror part 10, the width $L_m$ of the mirror or part 10 is selected from a range of 8 to 12 mm, and the length D of the mirror part 10 is selected from a range of 3 to 5 mm, so that the width and length of the mirror part 10 are set to $L_m$ 10.0 [mm]×D 4.0 [mm]. Further, the minimum value MIN of the resonance frequency $f_0$ of the oscillation part 40 is set to 1000 Hz, and the maximum value MAX of the resonance frequency $f_0$ is set to 3000 Hz. The range of the resonance frequency $f_0$ is set from the viewpoint that the reflecting device 1 is set to the specification suitable for the vehicle-mounted LiDAR. The mechanical swing angle $\theta_{Mech}$ [deg.] of the reflecting device 1 ranges from 25 degree to 35 degree that is the specification suitable for the vehicle-mounted LiDAR, and can be set to 35 degree such that the wide angle scanning is possible.

(Structural Design of the Mirror Part 10 and the Hinge Parts 30)

The parameters required to determine the structure of the reflecting device 1 are used, a value of each parameter is changed, and a relation between a mass M [mg] of the mirror part 10 and the resonance frequency $f_0$ [kHz] of the oscillation part 40 is calculated.

Here, as the length $L_f$ [mm] of each hinge part 30 becomes short, the reflecting device 1 can be downsized, and thus the mass M of the mirror part 10 and the resonance frequency $f_0$ of the oscillation part 40 when the length $L_f$ [mm] of each hinge part 30 is minimum are set to optimum solutions. In the reflecting device of the embodiment of the invention, the length $L_f$ [mm] of each hinge part 30 is defined as a distance between the mirror part 10 and the support frame 20 without depending on the shape of each hinge part 30.

Figure 7:
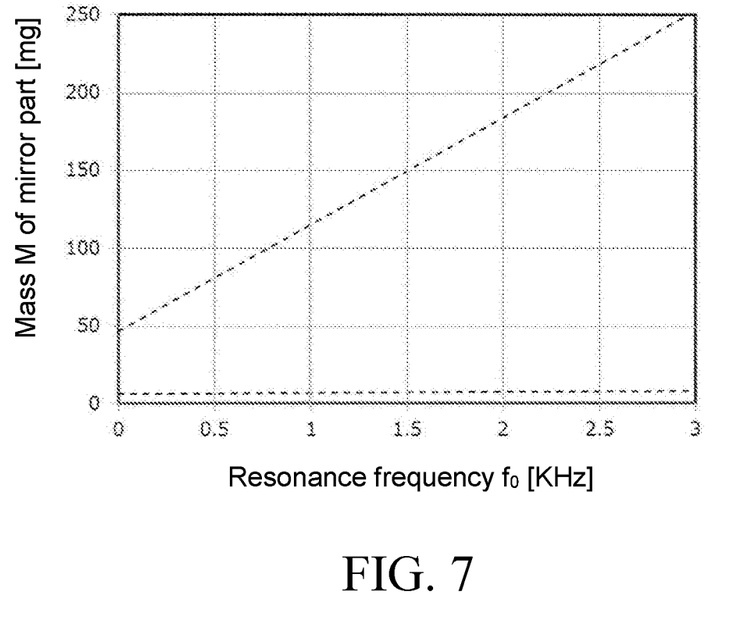
FIG. 7 is a graph illustrating a relation between a resonance frequency $f_0$ [kHz] and a mass M [mg] of a mirror part in the reflecting device of the first embodiment.

FIG. 7 is a graph illustrating the relation between the resonance frequency $f_0$ [kHz] of the oscillation part 40 and the mass M [mg] of the mirror part 10 in the reflecting device 1 of the first embodiment. As illustrated in FIG. 7, as a result of changing each parameter to design the reflecting device 1 such that the length of each hinge part 30 is minimum, if the mass M [mg] of the mirror part 10 and the resonance frequency $f_0$ [kHz] of the oscillation part 40 satisfy relational expression (1) below, it is ascertained that the downsized reflecting device 1 in which the area of the mirror part 10 can be widely formed and the wide angle scanning is possible is provided. Further, it is also ascertained that, in the reflecting device 1 of the first embodiment, a dimension of the length of each hinge part 30 which is parallel to the oscillation axis 100 can be set to 28 mm or less.

$$0.49*f_0+6.23 \leq M \leq 68.6*f_0+46.8 \qquad (1)$$

In relational expression (1), "68.6*$f_0$+46.8" on the right indicates a boundary line that determines an upper limit of the mass M [mg] of the mirror part 10. In relational expression (1), "0.49*$f_0$+6.23" on the left indicates a boundary line that determines a lower limit of the mass M [mg] of the mirror part 10. A region enclosed by the boundary lines that determine the upper and lower limits of the mass M [mg] of the mirror part 10 is the specification of the mirror part 10 of the reflecting device 1 of the first embodiment.

When the mass M [mg] of the mirror part 10 is a region below the boundary line that determines the upper limit, the entire reflecting device can be downsized. When the mass M [mg] of the mirror part 10 is a region above the boundary line that determines the lower limit, a mechanical swing angle $\theta_{Mech}$ [deg.] of the oscillation part 40 in which the wide angle scanning is possible can be achieved.

In this way, by performing design using the parameters required for the structural design, the reflecting device 1 of the first embodiment is turned out to be the downsized reflecting device in which the length of each hinge part 30 is set to the minimum value, the mirror area of the mirror part 10 can be increased, and the wide angle scanning is possible. Further, the reflecting device 1 of the first embodiment is turned out to be the downsized reflecting device that has the specification suitable for the vehicle-mounted LiDAR by performing optimization.

(Method of Manufacturing the Reflecting Device)

Next, a method of manufacturing the reflecting device 1 of the first embodiment will be described. A metal is punched to be an outer frame shape of the support frame 20. A resist is formed on a surface of the support frame 20 at a position corresponding to the oscillation part 40 made up of the mirror part 10 and the hinge parts 30. The metal is processed by etching using the resist as a mask. The oscillation part 40, which is included in the support frame 20 formed of a common metal and is made up of the mirror part 10 and the hinge parts 30, is integrally formed by etching so as to have a predetermined shape and thickness. Reflecting devices of second to sixth embodiments to be described below are also equally manufactured. When the recess or the opening that is the thinning part is formed in the bottom surface of the mirror part 10, the bottom surface is subjected to etching.

Second Embodiment

Figure 8A:
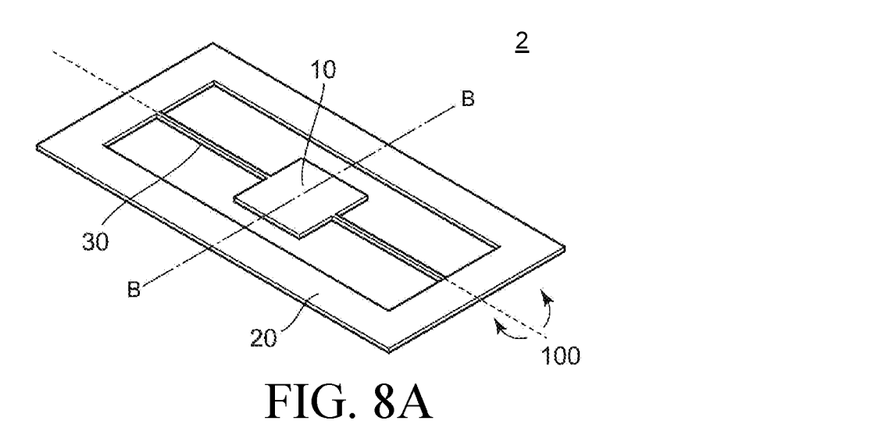
FIG. 8A is a perspective view (a top surface side) illustrating an outline of a reflecting device of a second embodiment
Figure 8B:
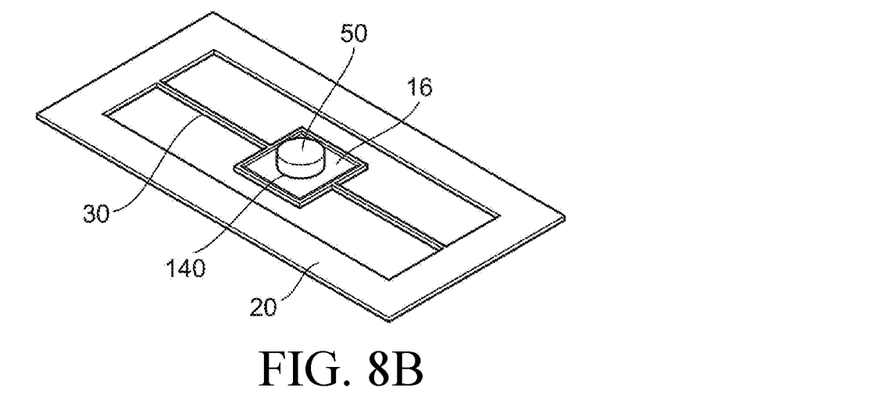
FIG. 8B is a perspective view (a bottom surface side) illustrating the outline of the reflecting device of the second embodiment.
Figure 8C:
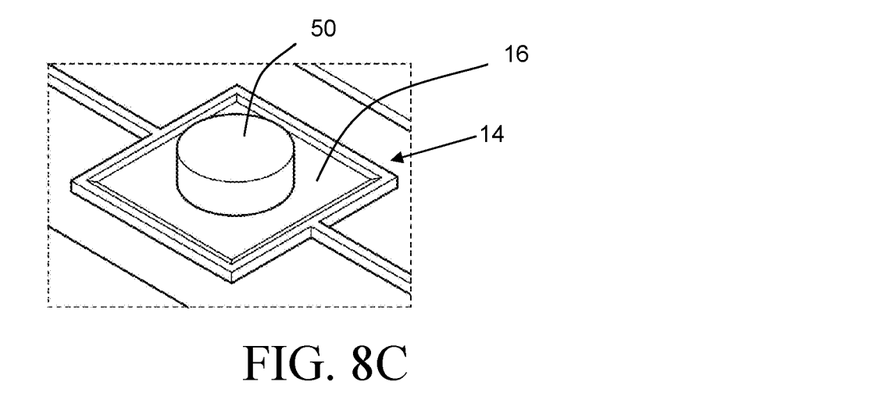
FIG. 8C is an enlarged view of a bottom surface side of a mirror part of the reflecting device of the second embodiment.

FIGS. 8A to 8C are perspective views illustrating an outline of a reflecting device 2 of a second embodiment. FIG. 8A is a perspective view illustrating a top surface side of the reflecting device 2. As illustrated in FIG. 8A, a basic structure of the reflecting device 2 is identical to that of the reflecting device 1 of the first embodiment.

FIG. 8B is a perspective view illustrating a bottom surface side of the reflecting device 2 of the second embodiment. As illustrated in FIG. 8B, the reflecting device 2 includes an electromagnetically driving magnet 50 on a bottom surface of a mirror part 10. The electromagnetically driving magnet 50 is fixed to a recess 16 that is a thinning part provided the bottom surface of the mirror part 10. FIG. 8C is an enlarged view of a bottom surface 14 of a mirror part 10. As illustrated in FIG. 8C, the bottom surface 14 of the mirror part 10 is configured to leave an outer edge of the mirror part 10 as an outer frame, the inside of the mirror part 10 is thinned to form the recess 16.

That is, a level difference is provided on the bottom surface 14 of the mirror part 10 by half etching, and the electromagnetically driving magnet 50 is fixed to the recess 16 of the half-etched mirror part 10. A portion that is not half-etched becomes the outer edge. A width of the outer edge is not particularly restricted, but it may be identical to a width 2a of each hinge part 30 from the viewpoint of reducing a mass of the mirror part 10.

Figure 9:
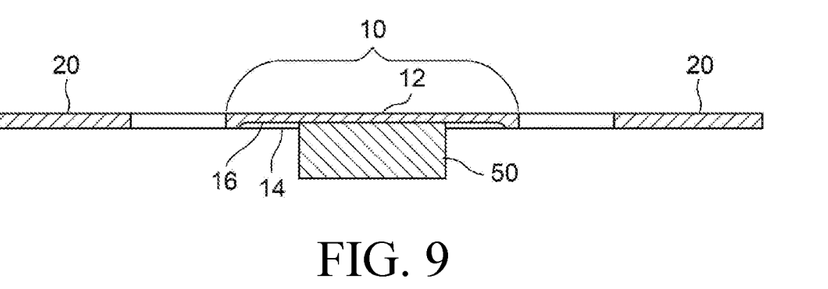
FIG. 9 is a sectional view illustrating a B-B sectional structure of the reflecting device of the second embodiment.

FIG. 9 is a sectional view illustrating a B-B sectional structure of the reflecting device 2 of the second embodiment. As illustrated in FIG. 9, since the recess 16 is formed by thinning the bottom surface 14 of the mirror part 10, the reflecting device 2 of the second embodiment can largely reduce a mass corresponding to the recess 16 in comparison with the mass of the mirror part 10 of the first embodiment which is not thinned.

In the reflecting device 2 of the second embodiment, parameters required to determine structures of the mirror part 10 and the hinge parts 30 are set. These parameters are used, a value of each parameter is changed, and a relation between a mass M [mg] of the mirror part 10 and a resonance frequency $f_0$ [kHz] of the oscillation part 40 is calculated. The mass M of the mirror part 10 and the resonance frequency $f_0$ of the oscillation part 40 when a length $L_f$ [mm] of each hinge part 30 is minimum are set to optimum solutions.

Figure 10:
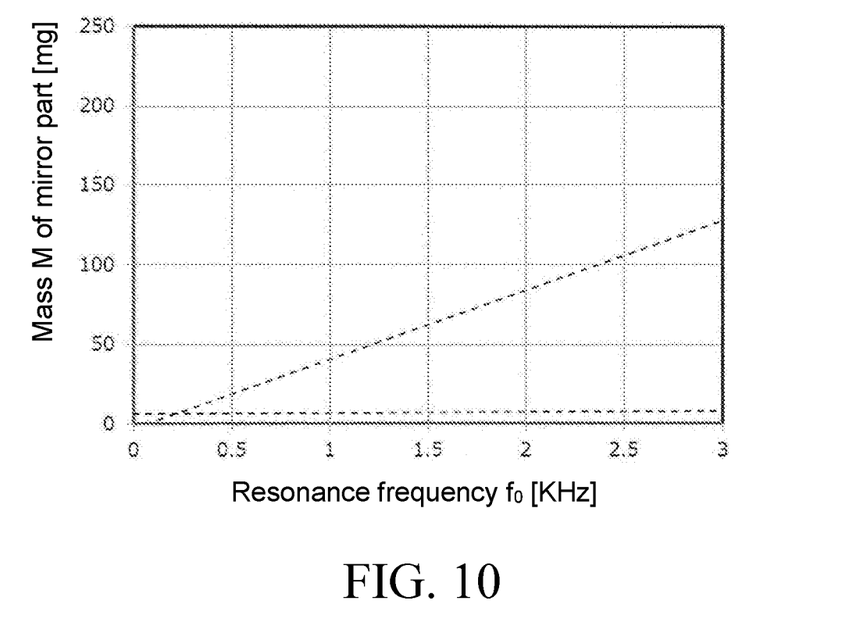
FIG. 10 is a graph illustrating a relation between a resonance frequency $f_0$ [kHz] and a mass M [mg] of the mirror part in the reflecting device of the second embodiment.

FIG. 10 is a graph illustrating the relation between the resonance frequency $f_0$ [kHz] of the oscillation part 40 and the mass M [mg] of the mirror part 10 in the reflecting device 2 of the second embodiment. As illustrated in FIG. 10, as a result of changing each parameter to design the reflecting device 2 such that the length of each hinge part 30 is minimum, if the mass M [mg] of the mirror part 10 and the resonance frequency $f_0$ [kHz] of the oscillation part 40 satisfy relational expression (2) below, it is ascertained that the downsized reflecting device 2 in which an area of the mirror part 10 can be widely formed and wide angle scanning is possible is provided. Further, it is also ascertained that, in the reflecting device 2 of the second embodiment, a dimension of the length of each hinge part 30 which is parallel to an oscillation axis 100 can be set to 28 mm or less.

$$0.49*f_0+6.23 \leq M \leq 43.68*f_0-3.12 \quad (2)$$

In relational expression (2), "$43.68*f_0-3.12$" that is present on the right side indicates a boundary line that determines an upper limit of the mass M [mg] of the mirror part 10 having the recess 16. In relational expression (2), "$0.49*f_0+6.23$" that is present on the left side indicates a boundary line that determines a lower limit of the mass M [mg] of the mirror part 10 having the recess 16.

A region enclosed by the boundary lines that determine the upper and lower limits of the mass M [mg] of the mirror part 10 having the recess 16 that is the thinning part is a specification of the mirror part 10 of the reflecting device 2 of the second embodiment. As illustrated in FIG. 10, in the reflecting device 2 of the second embodiment, since the bottom surface 14 of the mirror part 10 is thinned and the recess 16 is formed, the upper limit of the mass of the mirror part 10 is lower than that in the reflecting device 1 of the first embodiment When the mass M [mg] of the mirror part 10 having the recess 16 is a region below the boundary line that determines the upper limit, the entire reflecting device can be downsized. When the mass M [mg] of the mirror part 10 is a region above the boundary line that determines the lower limit, a mechanical swing angle $\theta_{Mech}$ [deg.] of the oscillation part 40 in which the wide angle scanning is possible can be achieved.

In this way, the reflecting device 2 of the second embodiment can largely reduce the mass M of the mirror part 10 because the bottom surface 14 of the mirror part 10 is thinned to thereby form the recess 16. Since the mass M of the mirror part 10 can be largely reduced, the length of each hinge part 30 of the reflecting device 2 can be further shortened. For this reason, the reflecting device 2 can be further downsized as a whole. The reflecting device 2 can be set to have a specification suitable, particularly, for the vehicle-mounted LiDAR, and can be used as a downsized reflecting device.

Third Embodiment

Figure 11A:
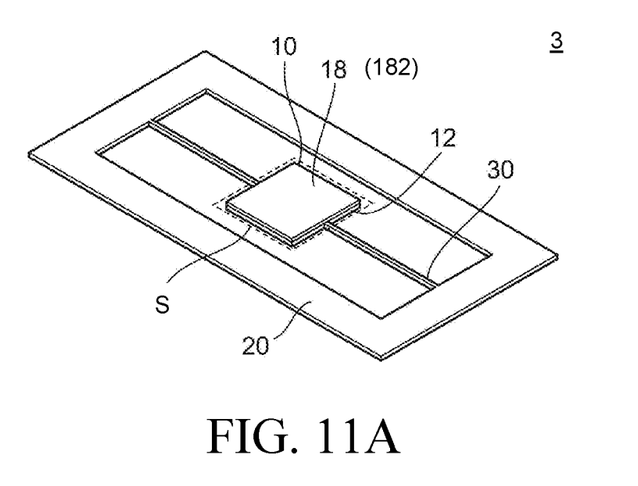
FIG. 11A is a perspective view (a top surface side) illustrating an outline of a reflecting device of a third embodiment.
Figure 11B:
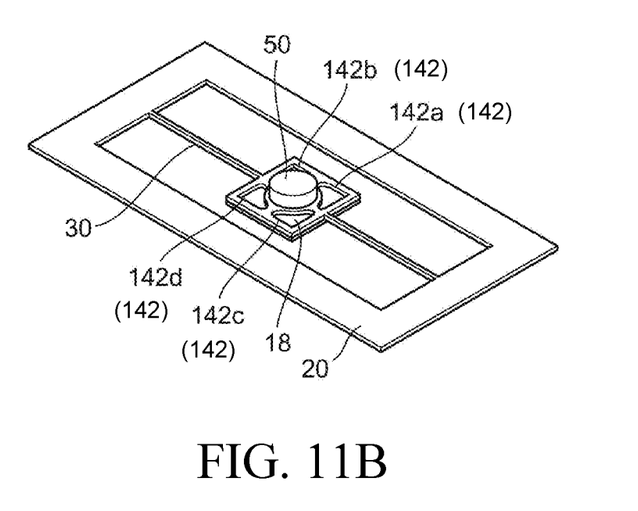
FIG. 11B is a perspective view (a bottom surface side) illustrating the outline of the reflecting device of the third embodiment.

FIGS. 11A and 11B are perspective views illustrating an outline of a reflecting device 3 of a third embodiment. FIG. 11A is a perspective view illustrating a top surface side of the reflecting device 3. As illustrated in FIG. 11A, a basic structure of the reflecting device 3 is identical to that of the reflecting device 1 of the first embodiment.

A mirror part 10 of the reflecting device 3 of the third embodiment includes a reflecting part 18 on a top surface 12 of the mirror part 10. That is, the mirror part 10 of the reflecting device 3 of the third embodiment is made up of top surface 12 of the mirror part 10 that is present on the same plane as the support frame 20 and the reflecting part 18 that is fixed to the top surface 12 of the mirror part 10. That is, the mirror part 10 of the reflecting device 3 of the third embodiment is made up of the reflecting part 18 and a metal part of the top surface 12 of the mirror part 10, and adopts a "double mirror part structure S" in which these members are joined.

In the mirror part 10, the metal part constituting the top surface 12 of the mirror part 10 and the reflecting part 18 are joined, and a reflecting film 182 acting as a reflecting layer is formed on a top surface of the reflecting part 18. The reflecting part 18 is not particularly restricted as long as it is a member that can be fixed to the mirror part 10 and a member capable of forming the reflecting film 182 on the top surface thereof. As the reflecting part 18, a glass substrate may be given as an example.

FIG. 11B is a perspective view illustrating a bottom surface side of the reflecting device 3 of the third embodiment. As illustrated in FIG. 11B, the reflecting device 3 includes an electromagnetically driving magnet 50 on a bottom surface 14 of a mirror part 10. Four openings 142a, 142b, 142c and 142d acting as thinning parts are provided in the bottom surface of the mirror part 10. The four openings 142a to 142d are formed in the bottom surface 14 of the mirror part 10 to leave a magnet receiving surface 140 for fixing the electromagnetically driving magnet 50 to the bottom surface of the mirror part 10.

As illustrated in FIG. 11B, the magnet receiving surface 140 has a circular shape to fix the electromagnetically driving magnet 50 and the bottom surface 14 of the mirror part 10. That is, the magnet receiving surface 140 is formed on the bottom surface of the mirror part 10, the magnet receiving surface 140 is disposed in the center of the bottom surface, and the four openings 142a to 142d are provided.

Shapes of the openings 142 are not particularly restricted as long as the openings 142 can fix the electromagnetically driving magnet 50 to the bottom surface 14 of the mirror part 10 and maintain a sufficient mechanical strength with respect to oscillation of an oscillation part 40. The number of openings 142 is not also particularly restricted as long as the openings 142 can fix the electromagnetically driving magnet 50 to the bottom surface 14 of the mirror part 10 and have a sufficient mechanical strength with respect to the oscillation of an oscillation part 40. All of the four openings 142a, 142b, 142c and 142d may be the same shape or different shapes.

The mirror part 10 of the reflecting device 3 of the third embodiment is characterized in that it includes the reflecting part 18 on the top surface 12 of the mirror part 10 and an area S1 of the reflecting part 18 and an area S2 of the metal part constituting the top surface 12 of the mirror part 10 satisfy relational expression (3) below.

$$S1 \geq S2 \quad (3)$$

Relational expression (3) above means that the area S1 of the reflecting part 18 is larger than the area S2 of the metal part that is joined with the reflecting part 18 and is the top surface 12 of the mirror part 10 which supports the reflecting part 18. The top surface 12 of the mirror part 10 which supports the reflecting part 18 is thinned, and thereby an area joined with the reflecting part 18 is reduced. For this reason, the area S1 of the reflecting part 18 is larger than the area S2 of the metal part.

Figure 12:
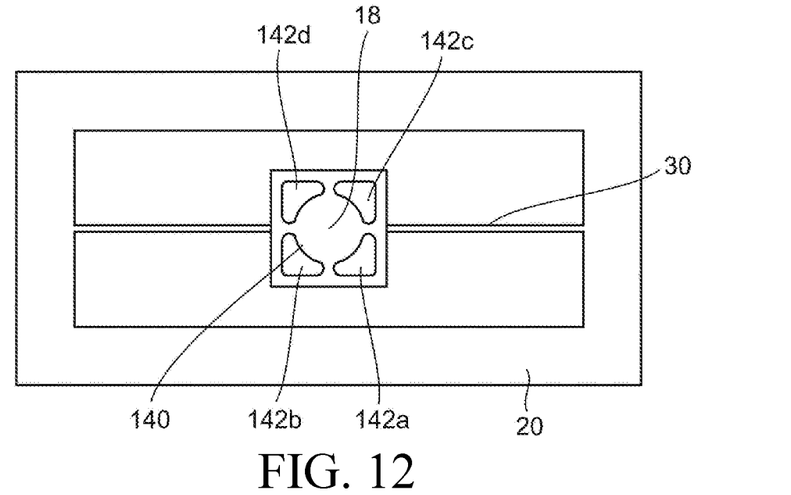
FIG. 12 is a top view of a top surface side of a mirror part of the reflecting device of the third embodiment.

FIG. 12 is a top view of the top surface side of the mirror part 10 of the reflecting device 3 of the third embodiment. As illustrated in FIG. 12, the mirror or part 10 adopts the "double mirror part structure S" that is made up of the top surface 12 of the mirror part 10 and the reflecting part (the glass substrate) 18 fixed to the top surface 12. Since an outer frame shape of the top surface 12 of the mirror part 10 and a shape of the reflecting part (the glass substrate) 18 are the same, and the reflecting film 182 can be provided on the reflecting part (the glass substrate) 18, a mirror area can be improved.

Means for fixing the top surface 12 of the metal part and the reflecting part (the glass substrate) 18 that constitute the mirror part 10 is not particularly restricted. For example, an epoxy-based adhesive may be coated on the top surface 12 of the mirror part 10, the reflecting part (the glass substrate) 18 may be placed on the top surface 12 on which the epoxy-based adhesive is coated, and then the top surface 12 and the reflecting part (the glass substrate) 18 may be bonded and fixed.

In this way, since the mirror part 10 is thinned to form the four openings 142a to 142d that are the thinning parts, the reflecting device 3 of the third embodiment can largely reduce a mass M of the mirror part 10. Since the mass M of the mirror part 10 can be largely reduced, a length of each hinge part 30 of the reflecting device 3 can be further shortened. For this reason, the reflecting device 3 can be downsized as a whole. As is apparent from FIG. 12, the four openings 142a to 142d that are the thinning parts are formed around the mirror part 10 to be symmetrical. It is also ascertained that, in the reflecting device 3 of the third embodiment, a dimension of the length of each hinge part 30 which is parallel to an oscillation axis 100 can be set to 28 mm or less.

In the reflecting device 3 of the third embodiment, since the reflecting part (the glass substrate) 18 is formed on the top surface of the mirror part 10, a degree of flatness of the mirror part 10 can be largely improved, and optical properties of the reflecting device can be improved. As a result, the reflecting device 3 of the third embodiment can be set to have a specification suitable, particularly, for the vehicle-mounted LiDAR, and can be used as a downsized reflecting device.

Fourth Embodiment

Figure 13:
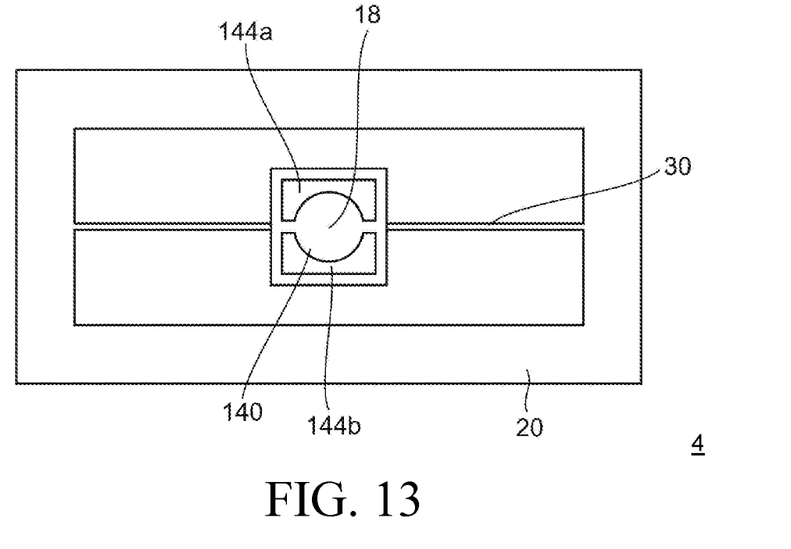
FIG. 13 is a top surface side of a mirror part of a reflecting device of a fourth embodiment.

FIG. 13 is a top view of a top surface side of a mirror part 10 of a reflecting device 4 of a fourth embodiment. As illustrated in FIG. 13, the mirror part 10 adopts the above "double mirror part structure S." An outer frame shape of a top surface 12 of a metal part constituting the mirror part 10 and a shape of a reflecting part (a glass substrate) 18 are the same. In the reflecting device 4 of the fourth embodiment, since the mirror part 10 is thinned to thereby form two openings 144a and 144b that are thinning parts, a mass M of the mirror part 10 can be largely reduced. Since the mass M of the mirror part 10 can be largely reduced, a length of each hinge part 30 of the reflecting device 4 can be further shortened. As is apparent from FIG. 13, the two openings 144a and 144b that are the thinning parts are formed around the mirror part 10 to be symmetrical. It is also ascertained that, in the reflecting device 4 of the fourth embodiment, a dimension of the length of each hinge part 30 which is parallel to an oscillation axis 100 can be set to 28 mm or less.

Fifth Embodiment

Figure 14:
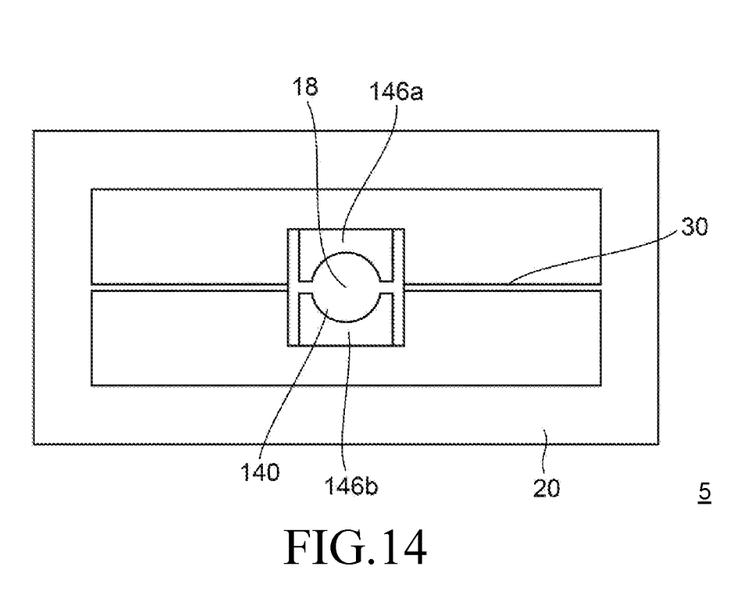
FIG. 14 is a top surface side of a mirror part of a reflecting device of a fifth embodiment.

FIG. 14 is a top view of a top surface side of a mirror part 10 of a reflecting device 5 of a fifth embodiment. As illustrated in FIG. 14, the mirror part 10 adopts the above "double mirror part structure S." An outer frame shape of a metal part constituting the mirror part 10 and a shape of a reflecting part (a glass substrate) 18 are not the same. Upper and lower portions of the metal part constituting the mirror part 10 are removed, and the mirror part 10 has a metal material of which two left and right mirror parts 10 coupled perpendicular to hinge parts 30 are formed, and a circular fixing part for fixing an electromagnetically driving magnet 50 to the mirror part 10.

In this way, in the reflecting device 5 of the fifth embodiment, since two openings 146a and 146b, which are removed by thinning a part of the mirror part 10, are provided around the fixing part are formed, and are thinning parts, are formed, a mass M of the mirror part 10 can be largely reduced. Since the mass M of the mirror part 10 can be largely reduced, a length of each hinge part 30 of the reflecting device 5 can be further shortened. As is apparent from FIG. 14, the two openings 146a and 146b that are the thinning parts are formed around the mirror part 10 to be symmetrical. It is also ascertained that, in the reflecting device 5 of the fifth embodiment, a dimension of the length of each hinge part 30 which is parallel to an oscillation axis 100 can be set to 28 mm or less.

Sixth Embodiment

Figure 15:
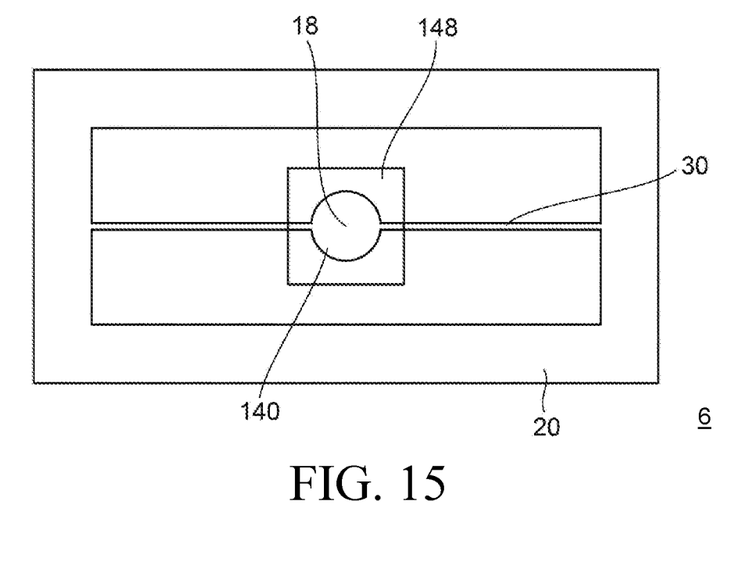
FIG. 15 is a top surface side of a mirror part of a reflecting device of a sixth embodiment.

FIG. 15 is a top view of a top surface side of a mirror part of a reflecting device 6 of a sixth embodiment. As illustrated in FIG. 15, the mirror part 10 adopts the above "double mirror part structure S" like the third embodiment. The mirror part 10 is formed only by a circular fixing part by which a metal part constituting the mirror part 10 fixes an electromagnetically driving magnet 50 to the mirror part 10. In this way, in the reflecting device 6 of the sixth embodiment, surroundings of the fixing part are thinned (thinning part 148), and thereby a mass M of the mirror part 10 can be largely reduced. Since the mass M of the mirror part 10 can be largely reduced, a length of each hinge part 30 of the reflecting device 6 can be further shortened. It is also ascertained that, in the reflecting device 6 of the sixth embodiment, a dimension of the length of each hinge part 30 which is parallel to an oscillation axis 100 can be set to 28 mm or less.

In an embodiment of the reflecting device, wherein a thinning part is formed on a surface different from a reflecting surface of the mirror part; and the mass M of the mirror part and the resonance frequency $f_0$ of the oscillation part satisfy relational expression (2) below, $$0.49*f_0+6.23 \leq M \leq 43.68*f_0-3.12 \qquad (2).$$

In an embodiment of the reflecting device, wherein the mirror part includes a metal part and a reflecting part joined with the metal part; and a reflecting layer is formed on a top surface of the reflecting part.

In an embodiment of the reflecting device, wherein an area S1 of the reflecting part and an area S2 of the metal part satisfy relational expression (3) below, $$S1 \geq S2 \qquad (3).$$

In an embodiment of the reflecting device, wherein the hinge part is formed of a metal.

In an embodiment of the reflecting device, wherein the metal part has a fixing part for fixing an electromagnetically driving magnet to the mirror part; and the reflecting device has a thinning part around the fixing part.

In an embodiment of the reflecting device, wherein a piezoelectric element is mounted on the support frame.

In an embodiment of the reflecting device, wherein the tensile strength of the hinge part is 3500 MPa or lower.

In an embodiment of the reflecting device, wherein a dimension of a length of the hinge part which is parallel to an oscillation axis is 28 mm or less.

In an embodiment of the reflecting device, wherein the oscillation part is formed to be symmetrical with respect to a center of the mirror part.

In an embodiment of the reflecting device, wherein the hinge part being extended from a middle portion of left and right lateral surfaces of the mirror part, and is engaged with an inside of the support frame.

In an embodiment of the reflecting device, wherein a thinning rate OP (%) calculated by forming a thinning part on a surface different from a reflecting surface of the mirror part is 20% or higher and 80% or lower.

In an embodiment of the reflecting device, wherein the resonance frequency $f_0$ of the oscillation part is set, and an angle generated during the oscillation part is oscillated with respect to the support frame by the resonance frequency $f_0$ is set to a mechanical swing angle $\theta_{Mech}$; and the mechanical swing angle $\theta_{Mech}$ ranges from 25 degree to 35 degree.

In an embodiment of the reflecting device, wherein a minimum value of the resonance frequency $f_0$ of the oscillation part is 1000 Hz; and a maximum value of the resonance frequency $f_0$ of the oscillation part is 3000 Hz.

In an embodiment of the reflecting device, further comprising: a coil, wherein the coil faces the electromagnetically driving magnet.

In an embodiment of the reflecting device, wherein a surface different from a reflecting surface of the mirror part is configured to leave an outer edge of the mirror part as an outer frame, and an inside of the mirror part is thinned to form a recess that is a thinning part.

In an embodiment of the reflecting device, wherein four openings are provided as the thinning part; and the four openings are formed to leave a magnet receiving surface for fixing the electromagnetically driving magnet to a bottom surface of the mirror part.

In an embodiment of the reflecting device, wherein two openings are provided as the thinning part; and the two openings are formed around the mirror part to be symmetrical.

In an embodiment of the reflecting device, wherein upper and lower portions of the metal part constituting the mirror part are removed; and the reflecting device has: a meal material of which two left and right mirror parts coupled perpendicular to the hinge part are formed, and the fixing part in a circular shape for fixing the electromagnetically driving magnet to the mirror part.

In an embodiment of the reflecting device, wherein the metal part is formed of only the fixing part in a circular shape for fixing the electromagnetically driving magnet to the mirror part.

While the embodiments of the invention have been described, the invention is not limited to the above embodiments, and all modifications on the condition that they do not depart the gist of the invention fall within the application range of the invention.

Since the reflecting device of an embodiment of the invention is a downsized reflecting device in which a mirror area is large and wide angle scanning is possible, use as the ranging sensor that is the optical scanning device is expected. Since the reflecting device of an embodiment of the invention is a downsized reflecting device that has a specification suitable, particularly, for the vehicle-mounted LiDAR, it can be used in vehicle related industries and vehicle electric component related industries.

What is claimed is:

1. A reflecting device, comprising:
   an oscillation part, comprising:
      a mirror part, supported on a support frame; and
      a hinge part, engaging the mirror part and the support frame,
   wherein the mirror part oscillates with respect to the support frame,
   the hinge part has a tensile strength of 1500 MPa or higher,
   a mass M of the mirror part and a resonance frequency $f_0$ of the oscillation part satisfy relational expression (1) below, $$0.49*f_0+6.23 \leq M \leq 68.6*f_0+46.8 \qquad (1),$$

wherein the mirror part includes a metal part and a reflecting part joined with the metal part;
   a reflecting layer is formed on a top surface of the reflecting part;
   the reflecting part is joined and fixed to a part of the metal part, and the mirror part other than the part is thinned.

2. The reflecting device according to claim 1, wherein
   a thinning part is formed on a surface different from a reflecting surface of the mirror part; and
   the mass M of the mirror part and the resonance frequency $f_0$ of the oscillation part satisfy relational expression (2) below, $$0.49*f_0+6.23 \leq M \leq 43.68*f_0-3.12 \qquad (2).$$

3. The reflecting device according to claim 1, wherein
   an area S1 of the reflecting part and an area S2 of the metal part satisfy relational expression (3) below, $$S1 \geq S2 \qquad (3).$$

4. The reflecting device according to claim 1, wherein
   the metal part has a fixing part fixing an electromagnetically driving magnet to the mirror part; and
   the reflecting device has a thinning part around the fixing part.

5. The reflecting device according to claim 4, further comprising:
   a coil,
   wherein the coil faces the electromagnetically driving magnet.

6. The reflecting device according to claim 4, wherein four openings are provided as the thinning part; and
the four openings are formed to leave a magnet receiving surface for fixing the electromagnetically driving magnet to a bottom surface of the mirror part.

7. The reflecting device according to claim 4, wherein two openings are provided as the thinning part; and
the two openings are formed around the mirror part to be symmetrical.

8. The reflecting device according to claim 4, wherein upper and lower portions of the metal part constituting the mirror part are removed; and
the reflecting device has:
   a meal material of which two left and right mirror parts coupled perpendicular to the hinge part are formed, and
   the fixing part in a circular shape for fixing the electromagnetically driving magnet to the mirror part.

9. The reflecting device according to claim 4, wherein the metal part is formed of only the fixing part in a circular shape for fixing the electromagnetically driving magnet to the mirror part.

10. The reflecting device according to claim 1, wherein the hinge part is formed of a metal.

11. The reflecting device according to claim 1, wherein a piezoelectric element is mounted on the support frame.

12. The reflecting device according to claim 1, wherein the tensile strength of the hinge part is 3500 MPa or lower.

13. The reflecting device according to claim 1, wherein a dimension of a length of the hinge part which is parallel to an oscillation axis is 28 mm or less.

14. The reflecting device according to claim 1, wherein the oscillation part is formed to be symmetrical with respect to a center of the mirror part.

15. The reflecting device according to claim 1, wherein the hinge part being extended from a middle portion of left and right lateral surfaces of the mirror part, and is engaged with an inside of the support frame.

16. The reflecting device according to claim 1, wherein a thinning rate OP (%) calculated by forming a thinning part on a surface different from a reflecting surface of the mirror part is 20% or higher and 80% or lower.

17. The reflecting device according to claim 1, wherein the resonance frequency $f_0$ of the oscillation part is set, and
an angle generated during the oscillation part is oscillated with respect to the support frame by the resonance frequency $f_0$ is set to a mechanical swing angle $\theta_{Mech}$; and
the mechanical swing angle $\theta_{Mech}$ ranges from 25 degree to 35 degree.

18. The reflecting device according to claim 1, wherein a minimum value of the resonance frequency $f_0$ of the oscillation part is 1000 Hz; and
a maximum value of the resonance frequency $f_0$ of the oscillation part is 3000 Hz.

19. The reflecting device according to claim 1, wherein a surface different from a reflecting surface of the mirror part is configured to leave an outer edge of the mirror part as an outer frame, and
an inside of the mirror part is thinned to form a recess that is a thinning part.

* * * * *